United States Patent [19]

Murphy, Jr. et al.

[11] Patent Number: 4,804,588

[45] Date of Patent: Feb. 14, 1989

[54] MULTI-LAYER ALLOY STEEL WEAR STRUCTURE AND PROCESS FOR MAKING SAME

[75] Inventors: Grant J. Murphy, Jr.; Howard S. Turnipseed, both of Birmingham, Ala.

[73] Assignee: Tricon Metals & Services, Inc., Birmingham, Ala.

[21] Appl. No.: 119,147

[22] Filed: Nov. 10, 1987

[51] Int. Cl.$^4$ ............................................. B32B 15/18
[52] U.S. Cl. ................................ 428/683; 428/684; 428/685; 403/404
[58] Field of Search ............... 403/404, 161, 162, 150, 403/151; 428/681–685

[56] References Cited

U.S. PATENT DOCUMENTS 3,929,428  12/1975  Nishi et al. ..................... 428/684

FOREIGN PATENT DOCUMENTS 2150151  6/1985  United Kingdom ............... 428/683

*Primary Examiner*—Deborah Yee
*Attorney, Agent, or Firm*—Jennings, Carter, Thompson & Veal

[57] ABSTRACT

A steel wear pin or shaft product utilizes three separate alloys each having opposing metallurgical properties in a core and outer layers which form a structure optimizing the desired properties of each alloy, thus providing a superior product with a substantially improved service life.

12 Claims, 1 Drawing Sheet

MULTI-LAYER ALLOY STEEL WEAR STRUCTURE AND PROCESS FOR MAKING SAME

FIELD OF THE INVENTION

The present invention relates to steel products, particularly wear pins and shafts having regions thereon susceptible to wear. More particularly the present invention relates to the aforementioned steel products having superior anti-galling and stress resistance properties. In even greater particularity, the present invention relates to the aforementioned steel products formed from a core alloy, an intermediate layer of a second alley and an outer layer of a third alloy with each alloy having different metallurgical properties.

BACKGROUND OF THE INVENTION

Traditional pins for dragline rigging and other earth moving equipment has had a service life of three to four weeks. Likewise bearing mounted shafts which are susceptible to high-wear environments have had very short service life. Conventionally the steel products have been made from alloy steel of a uniform chemistry, with the outer surface of the product being hardened by conventional heating and quenching techniques, such that a hardened outer shell was formed about a tough inner core. As noted hereinabove, this conventional technology suffers severe service life constraints and leaves a great deal to be desired in that regard.

SUMMARY OF THE INVENTION

It is an object of the present invention to provide alloy steel wear pins and shafts possessing adequate mechanical, metallurgical and wear resistant properties for all applications in the as coated condition.

Another object of the invention is to provide alloy steel wear pins and shafts having an outer layer with a complex metallurgical structure exhibiting novel antigalling properties.

Yet another object of the invention is to provide alloy steel wear pins and shafts having the above exterior anti-galling properties about a base material having adequate mechanical properties to reduce failure due to impact, failure, wear, and tensile or compressive stresses.

Still another object of the invention is to provide a wear pin or shaft wherein an intermediate layer of alloy steel having shock absorbing or crack arresting properties is disposed between said base material and exterior layer.

These and other objects, advantages and features are obtained in our invention through the use of three different alloys, each having opposing metallurgical properties, in a combination which optimizes the properties of each alloy thus giving the overall structure a combination of properties not heretofore attained. This combination provides a steel product which can withstand tensile and/or compressive stresses, impact, fatigue and wear which none of the three alloys can withstand individually.

More specifically, our steel product, either wear pins or shafts, utilizes a core of an alloy selected for its strength and resistance to failure due to fatigue. An outer layer having a complex martensitic structure surrounds the core and provides novel antigalling properties, while an intermediate layer selected for its shock absorbing and crack arresting properties is placed between the core and the outer layer.

BRIEF DESCRIPTION OF THE DRAWINGS

Apparatus embodying features of our invention are depicted in the accompanying drawings which form a portion of this disclosure and wherein.

DESCRIPTION OF A PREFERRED EMBODIMENT

Figure 1:
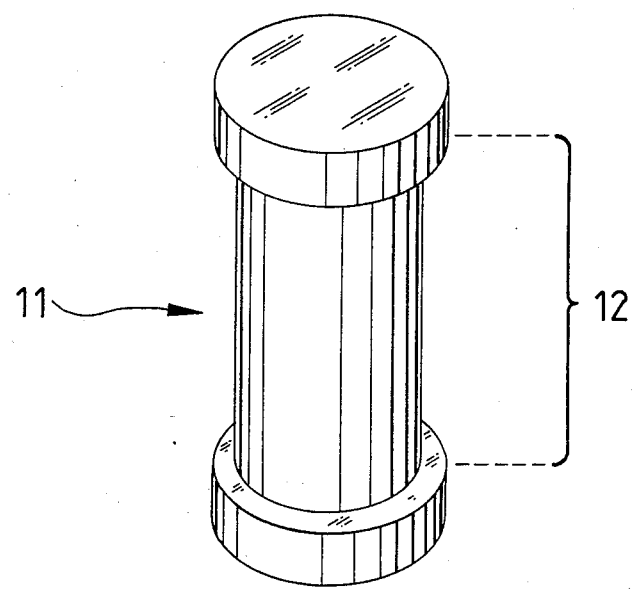
FIG. 1 is a perspective depiction of a section of core alloy showing a region thereof where the diameter has been reduced prior to the addition of the inner and outer alloy layers.
Figure 2:
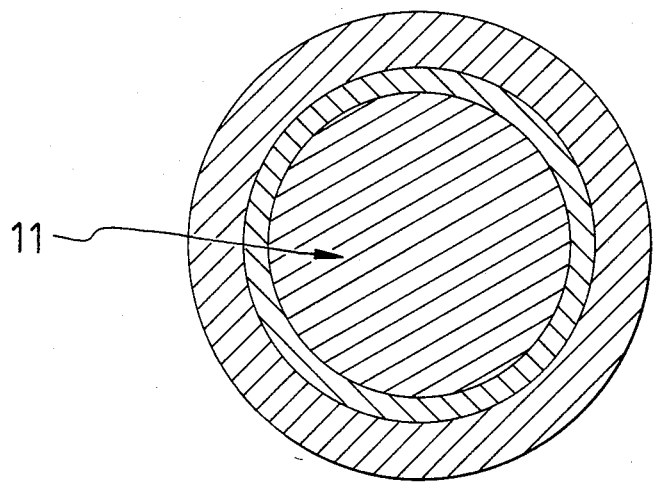
FIG. 2 is a sectional view of the finished product.

Wear pins or shaft sections produced in accordance with our invention will normally have a diameter of three inches or greater. As may be seen in FIGS. 1 and 2, such pins and shafts comprise a substantial core formed of an alloy, and two layers of different alloy materials. In producing the product a length of core material 11 suitable for a pin or shaft has the diameter thereof reduced by about ½ to 1 inch in a region 12 where the product is susceptible to wear. The reduced region is then built up by welding using an adequate number of layers of a second alloy material to form a layer at least 1/16 of an inch thick which is 100% bonded to the core material. Thereafter, the region is further built up by welding using an adequate number of layers of a third alloy material to form a layer of about 3/16 to 1 inch thick which is 100% bonded to the intermediate layer. Standard manual and semi-automatic or automatic welding procedures, as well as pre-determined pre- and post-heat procedures are used to assure sound welds. After applying the outer layer, the alloy steel wear pin or shaft is machined to the desired size using carbide tooling.

The alloy used for the core material may comprise in weight percent, from 0.25 to 0.50% Carbon, 0.50 to 1.00% Manganese, 0.040% maximum Phosphorous, 0.10% 0.40% Silicon, 0.01 to 1.20% Chromium, 0.01 to 2.0% Nickel, 0.10 to 0.50% Molybdenum, 0.01 to 0.10% acid soluble Aluminum, residual Copper and the balance iron except for incidental impurities.

The alloy used as the intermediate layer comprises in weight percent, about 0.01 to 0.10% Carbon, 0.50 to 1.50% Manganese, 0.040% maximum Phosphorous, 0.040% maximum Sulphur, 0.25 to 1.00% Silicon, 0.01 to 0.50% Chromium, 0.50 to 1.50% Nickel, 0.01 to 0.40% Molybdenum, 0.01 to 0.10% acid soluble Aluminum, residual Copper and the balance iron except for incidental impurities.

The alloy used as the outer layer comprises, by weight percent, about 0.20 to 1.00% Carbon, 0.50 to 3.00% Manganese, 0.010% maximum Phosphorous, 0.40% maximum Sulphur, 0.30 to 1.50% Silicon, 4.00 to 8.00% Chromium, 0.01 to 1.50% Nickel, 0.50 to 2.00% Molybdenum, 1.00 to 2.00% Tungsten, 0.01 to 0.10 acid soluble Aluminum, residual Copper and the balance iron, except for incidental impurities.

Various constituents of the alloys and their effects are discussed hereinafter.

Carbon contributes to the strength and fatigue properties of the core alloy, thus a minimum 0.25% is needed; however, carbon in excess of above 0.50% yields a decrease in toughness (energy absorption capacity) and significantly increases the alloy's susceptibility to cracking during processing. The low carbon content of the alloy used in the intermediate layer yields an increase in toughness so that this layer will act as a crack-arrester zone. The 0.20% minimum carbon in the alloy used as the outer layer assures the formation of a martensitic matrix and provides adequate carbon to form complex carbide for improving the wear resistance, however, carbon in excess of about 1.00% impairs the ductility of the alloy.

Manganese at a minimum of about 0.50% in all of the alloys contributes in providing adequate strength and toughness. The maximum amount of Manganese increases in the alloys used in the intermediate and outer layers to enhance toughness and is mainly contributed by the type of flux used in applying these layers.

Phosphorous and Sulphur occur commonly as an impurity and should be restricted to a maximum of 0.040% to maximize toughness and improve the transverse impact toughness of the core alloy. It is preferable to restrict the Sulphur content to a maximum of 0.01% in both the core alloy and the intermediate layer alloy.

Silicon is provided for use in de-oxidation and provides some additional strength. The silicon content increases in the alloys used in the intermediate and outer layer and is also properly added through the flux used in applying these layers.

Chromium is required to control the depth of strengthening in the core alloy. Chromium at 0.01% is required when the minimum strength level of the core alloy is specified as 50,000 psi tensile strength while a maximum of 1.20% is used for higher strength and larger diameter products. The low chromium content in the alloy used in the alloy used in the intermediate layer is attributed to residual amounts (0.01% to 0.50%) obtained from the dilution with the core alloy. The very high chromium content (4.00% to 8.00%) of the outer layer allows the formation of chromium carbides required to enhance the antigalling properties and improves the overall wear resistance. It is preferable to restrict the chromium content to 5.00% to 6.00%.

Nickel helps provide the necessary toughness. Nickel of 0.01% is used when minimum toughness is required in the core alloy, while higher Nickel contents of up to a 2.00% maximum are used when maximum toughness in the core alloy is needed. The Nickel content of 0.50% to 1.50% is used in the intermediate layer to assure the toughness of this layer is adequate to act as a crack-arrest zone. The Nickel content of the outer alloy is not a specified requirement and is restricted to 0.10% to 1.50% due to dilution from the core and intermediate layers.

Molybdenum is used in the core alloy to provide adequate strength and toughness. Molybdenum content of 0.10% is used for the minimum properties while a maximum of 0.50% is used for higher strengths and toughness. The Molybdenum content of 0.01% to 0.40% is used in the alloy used in the intermediate layer to maximize the toughness of this layer. A maximum of 0.40% Molybdenum should be observed since amounts in excess of this could cause martensite formation which would degrade the toughness and is unacceptable. The Molybdenum content of the alloy used in the outer layer, 0.50% to 2.00% is required to develop the martensitic matrix of this layer and also to form the complex carbides that enhance the wear resistance of this layer. The Molybdenum content may also provide a lubricant mechanism which improves wear resistance. It is preferable to restrict the Molybdenum content to 0.90% to 1.50% in the outer layer alloy.

Aluminum is required for de-oxidation and for grain size control. At least about 0.01% in acid soluble form is needed for this purpose in the core, intermediate and outer alloys. Grain coarsening is detrimental to toughness and strength.

Tungsten is required at a minimum of 1.00% and a maximum of 2.00% in the alloy used in the outer layer. The Tungsten increases the hot hardness and hot strength of the outer layer which enhances the wear resistance due to high frictional stresses. It is preferable to restrict the Tungsten content to 1.2% to 1.5%.

While we have shown our invention in one form, it will be obvious to those skilled in the art that it is not so limited but is susceptible of various changes and modifications without departing from the spirit thereof.

What we claim is:

1. An alloy steel structure for use as a wear pin or part of a shaft having three layers, each layer having distinct composition when compared to any other layer comprising:
   (a) a core resistant to failure caused by impact, fatigue, tensile, or compression stresses;
   (b) an outer layer resistant to galling, wherein said outer layer is a steel alloy comprising 0.30 to 1.00 weight percent carbon, 4.00 to 8.00 weight percent chromium, 1.00 to 2.00 weight percent molybdenum, and 1.00 to 2.00 weight percent tungsten, the balance being iron; and
   (c) an intermediate layer providing a shock absorbing and crack arrest zone between said core and said outer layer.

2. A alloy steel structure as defined in claim 1 wherein said outer layer has a Rockwell c hardness of at least 20 $R_c$ at room temperature in the hot reduced condition.

3. An alloy steel structure as defined in claim 1 wherein said intermediate layer is a steel alloy comprising 0.01 to 0.50 weight percent chromium, 0.25 to 1.00 weight percent silicon, 0.01 to 1.50 weight percent nickel, 0.01 to 0.10 carbon, the balance being iron.

4. An alloy steel structure as defined in claim 3 wherein said core is a steel alloy comprising by weight percent: 0.25 to 0.50 carbon, 0.50 to 1.00 manganese, 0.01 to 1.20 chromium, 0.01 to 2.00 nickel, and 0.10 to 0.50 molybdenum, the balance being iron.

5. An alloy steel structure as defined in claim 1 wherein said core is a steel alloy comprising by weight percent: 0.25 to 0.50 carbon, 0.50 to 1.00 manganese, 0.01 to 1.20 chromium, 0.01 to 2.00 nickel, and 0.10 to 0.50 molybdenum, the balance being iron.

6. An alloy steel structure for use as a wear pin or part of a shaft having three layers, each layer having distinct composition when compared to any other layer comprising:
   (a) a core resistant to failure caused by impact, fatigue, tensile, or compression stresses;
   (b) an outer layer resistant to galling, wherein said outer layer is a steel alloy comprising about 0.30 to 1.00 weight percent carbon, about 5.00 to 6.00 weight percent chromium, about 0.90 to 1.50 weight percent molybdenum and about 1.20 to 1.50 weight percent tungsten, the balance being iron; and
   (c) an intermediate layer providing a shock absorbing and crack arrest zone between said core and said outer layer.

7. A alloy steel structure as defined in claim 6 wherein said outer layer has a Rockwell c hardness of at least 20 $R_c$ at room temperature in the hot reduced condition.

8. An alloy steel structure as defined in claim 6 wherein said intermediate layer is a steel alloy comprising 0.01 to 0.50 weight percent chromium, 0.25 to 1.00 weight percent silicon, 0.01 to 1.50 weight percent nickel, 0.01 to 0.10 carbon, the balance being iron.

9. An alloy steel structure as defined in claim 6 wherein said core is a steel alloy comprising by weight percent: 0.25 to 0.50 carbon, 0.50 to 1.00 manganese, 0.01 to 1.20 chromium, 0.01 to 2.00 nickel, and 0.10 to 0.50 molybdenum, the balance being iron.

10. An alloy steel structure as defined in claim 7 wherein said intermediate layer is a steel alloy comprising 0.01 to 0.50 weight percent chromium, 0.25 to 1.00 weight percent silicon, 0.01 to 1.50 weight percent nickel, 0.01 to 0.10 carbon, the balance being iron.

11. An alloy steel structure as defined in claim 7 wherein said core is a steel alloy comprising by weight percent: 0.25 to 0.50 carbon, 0.50 to 1.00 manganese, 0.01 to 1.20 chromium, 0.01 to 2.00 nickel, and 0.10 to 0.50 molybdenum, the balance being iron.

12. An alloy steel structure for use as a wear pin or part of a shaft having three layers, each layer having distinct composition when compared to any other layer:
(a) a core resistant to failure caused by impact, fatigue, tensile, or compression stresses;
(b) an outer layer resistant to galling; and
(c) an intermediate layer providing a shock absorbing and crack arrest zone between said core and said outer layer, wherein said intermediate layer is a steel alloy comprising 0.01 to 0.50 weight percent chromium, 0.25 to 1.00 weight percent silicon, 0.01 to 1.50 weight percent nickel, and from 0.01 to 0.10 weight percent carbon, the balance being iron.

* * * * *